(12) United States Patent
Magnusson et al.

(10) Patent No.: US 10,018,256 B1
(45) Date of Patent: Jul. 10, 2018

(54) LOW COST BLOCK AND TACKLE ROBOT TRANSMISSION

(71) Applicant: Redwood Robotics Inc., San Francisco, CA (US)

(72) Inventors: Lee Magnusson, San Francisco, CA (US); Matt Carney, Oakland, CA (US); Aaron Edsinger, San Francisco, CA (US); Jeff Weber, San Francisco, CA (US); Philip Mullins, San Francisco, CA (US)

(73) Assignee: X Development LLC, Mountain View, CA (US)

(*) Notice: Subject to any disclaimer, the term of this patent is extended or adjusted under 35 U.S.C. 154(b) by 1296 days.

(21) Appl. No.: 14/061,669

(22) Filed: Oct. 23, 2013

Related U.S. Application Data (60) Provisional application No. 61/719,871, filed on Oct. 29, 2012.

(51) Int. Cl.
| | |
|---|---|
| *F16H 19/08* | (2006.01) |
| *B66D 3/04* | (2006.01) |
| *B25J 9/10* | (2006.01) |
| *F16H 19/06* | (2006.01) |

(52) U.S. Cl.
CPC ............ *F16H 19/06* (2013.01); *B25J 9/1045* (2013.01); *B66D 3/04* (2013.01); *F16H 19/0672* (2013.01); *F16H 2019/0668* (2013.01); *F16H 2019/085* (2013.01)

(58) Field of Classification Search
CPC ...... F16H 19/06; F16H 19/0631; F16H 55/00; F16H 55/171; F16H 2019/0686; F16H 19/0672; F16H 19/005; F16H 2019/0668; F16H 19/006; F16H 2019/085; B66D 3/04; B66D 3/043; B66D 3/06; B66D 3/08; B25J 9/104; B25J 9/1045; B25J 17/00
USPC ......................................... 74/82, 89.2, 89.22
See application file for complete search history.

(56) References Cited

U.S. PATENT DOCUMENTS

| | | | | |
|---|---|---|---|---|
| 3,524,391 A | * | 8/1970 | Fujii ......................... | G03B 7/06 356/222 |
| 4,804,285 A | * | 2/1989 | Bradford ................. | B41J 19/005 400/313 |
| 5,207,114 A | * | 5/1993 | Salisbury, Jr. ........... | B25J 9/046 414/7 |
| 5,234,386 A | * | 8/1993 | Nagai ...................... | B23Q 1/56 474/101 |
| 5,513,946 A | * | 5/1996 | Sawada .................... | B25J 9/042 414/744.5 |

(Continued)

OTHER PUBLICATIONS https://www.omega.com/literature/transactions/volume3/strain2.html printout, pp. 4.*

*Primary Examiner* — Terence Boes
*Assistant Examiner* — Bobby Rushing, Jr.
(74) *Attorney, Agent, or Firm* — McDonnell Boehnen Hulbert & Berghoff LLP (57) ABSTRACT

A block-and-tackle transmission includes a timing belt input pinion, a timing belt, two or more shuttles, an output cable, and an output hub. The timing belt input pinion is for receiving input power. The timing belt is driven by the input pinion. The timing belt causes two shuttles of the two or more shuttles to move in opposing directions. Opposing ends of the output cable are pulled by two of the two or more shuttles. The output cable causes the output hub to transmit output power.

22 Claims, 10 Drawing Sheets

(56) References Cited

U.S. PATENT DOCUMENTS

| | | | | |
|---|---|---|---|---|
| 6,904,905 B2* | 6/2005 | Kuttalek | .............. | F24C 15/027 |
| | | | | 126/19 M |
| 7,648,436 B2* | 1/2010 | Horst | ..................... | F16H 19/06 |
| | | | | 474/117 |
| 8,192,365 B2* | 6/2012 | Kadokura | ................ | A61B 8/12 |
| | | | | 600/459 |
| 8,516,913 B2* | 8/2013 | Jones | ..................... | F16H 19/06 |
| | | | | 474/84 |
| 8,992,565 B2* | 3/2015 | Brisson | ................. | A61B 17/00 |
| | | | | 606/205 |
| 9,416,855 B2* | 8/2016 | Shim | ....................... | B25J 9/104 |
| 2007/0227834 A1* | 10/2007 | Mieze | ................. | B60T 11/046 |
| | | | | 188/2 R |
| 2010/0243344 A1* | 9/2010 | Wyrobek | ................ | B25J 5/007 |
| | | | | 180/21 |
| 2015/0336266 A1* | 11/2015 | Kfoury | ................ | B25J 9/1065 |
| | | | | 74/490.05 |

\* cited by examiner

LOW COST BLOCK AND TACKLE ROBOT TRANSMISSION

This application claims priority to U.S. Provisional Patent Application No. 61/719,871 entitled LOW COST BLOCK AND TACKLE ROBOT TRANSMISSION filed Oct. 29, 2012 which is incorporated herein by reference for all purposes.

BACKGROUND OF THE INVENTION

Electric motor actuators for robotic and automation systems often require a transmission (speed reducer) in order to operate within the speed-torque requirements of the application and of the motor. Commonly used solutions include multi-stage gearboxes, timing belts, cables with capstans, Harmonic Drives, and cycloid gearboxes. These solutions are often too inefficient, susceptible to overload damage, heavy, and require expensive precision manufacturing. They are also often too expensive for consumer products when high performance is required. Harmonic Drive is most commonly used in high performance applications where low backlash and gear-ratios greater than 50:1 are required. The Harmonic Drive is proprietary, heavy, inefficiency, and too expensive for consumer application. Cable drive systems can be lightweight and efficient. However, non-trivial transmission ratios lead to complex multi-stage designs that require high preload forces and challenging cable management. Often it is desired to integrate a torque sensor such as a strain gauge loadcell into the transmission in order to achieve closed loop torque control. Practically, integration of this sensor can prove challenging as the sensor wires typically rotate with the transmission output and therefore require cable management.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A block-and-tackle transmission is disclosed. A block-and-tackle transmission comprises a timing belt input pinion, a timing belt, two or more shuttles, an output cable, and an output hub is disclosed. The timing belt input pinion is for receiving input power. The timing belt is driven by the input pinion. The timing belt causes two shuttles of the two or more shuttles to move in opposing directions. Opposing ends of the output cable are pulled by two of the two or more shuttles. The output cable causes the output hub to transmit output power.

An actuator transmission that can be produced commercially for low cost, yet retain the characteristic required for high performance is disclosed. These characteristics include a high torque-to-mass ratio, high efficiency, high overload torque protection, and low backlash. Also, the transmission can be manufactured without high precision processes and enables a simple method to measure the produced output torque. The transmission is capable of high efficiency, zero backlash, and high load capacity while remaining lightweight. It is constructed from inexpensive materials and does not require high tolerance precision components. It enables more compact packaging than traditional belt and cable transmissions and also provides a simple method for integrating a torque sensor. There are other actuators that can achieve some of the characteristics of a high performance transmission as defined above. However, the block and tackle design satisfies them all. For example, a transmission made up of one or more stages of spur gears, can have very high efficiency and a high torque to mass ratio, but requires precision parts/assemblies to minimize backlash and can fail under impact loading. A transmission comprised of all timing belts will have zero backlash, protection from torque overloads, and can be inexpensively produced, but the size of a belt transmission with a similar gear ratio and torque output will be significantly larger than a block and tackle transmission and will have a lower efficiency.

Figure 1:
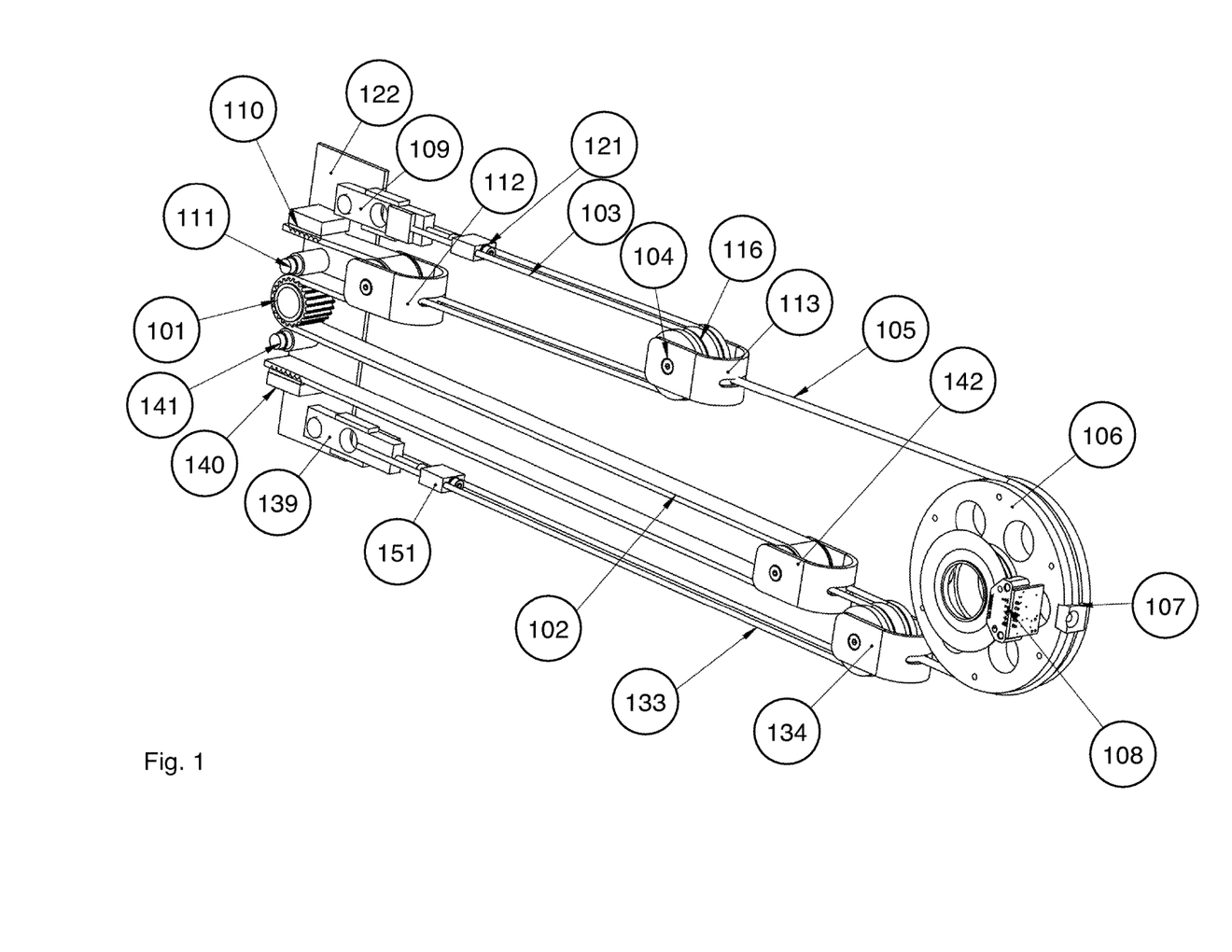
FIG. 1 is a diagram illustrating an embodiment of a block-and-tackle transmission.

FIG. 1 is a diagram illustrating an embodiment of a block-and-tackle transmission. In the example shown, the block-and-tackle transmission of FIG. 1 comprises timing belt input pinion 101; timing belt 102; stage-1 cable 103 and stage-1 cable 133; stage-2 shuttle 104 and stage-2 shuttle 134; output cable 105; output hub 106; output cable termination 107; output angle sensor 108; tension sensor 109 and tension sensor 139; belt termination 110 and belt termination 140; belt idler 111 and belt idler 141; stage-1 shuttle 112 and stage-1 shuttle 142; shuttle clevis 113; shuttle pulley 116; tensioner 121 and tensioner 151; and transmission chassis 122.

In the example shown, the block-and-tackle transmission comprises timing belt input pinion 101 and output hub 106. Timing belt input pinion 101 is a toothed timing pulley used to drive timing belt 102 in a linear motion. In some embodiments, timing belt input pinion 101 comprises a timing belt input pinion for receiving input power. The linear motion of the belt is used to drive stage-1 shuttle 112 and stage-1 shuttle 142 arranged on each side of the input pinion. In some embodiments, stage-1 shuttle 112 and stage-1 shuttle 142 comprise two shuttles of two or more shuttles. In some embodiments, the timing belt causes two shuttles of the two or more shuttles to move in opposing directions. The block-and tackle shuttle mechanisms provide speed reduction and force amplification. In some embodiments, a second block-and-tackle stage comprising an additional stage-1 shuttle 112, stage-1 cable 103, and output cable 105 is employed to extend the transmission gearing. Output cable 105 is affixed to and wraps around output hub 106. In some embodiments, opposing ends of output cable 105 are pulled by two of the two or more shuttles, and output cable 105 causes output hub 106 to transmit output power. Rotation of timing belt input pinion 101 therefore causes rotation of output hub 106 with the speed reduced by some factor (e.g., the transmission ratio). The transmission ratio comprises the ratio of the diameter of output hub 106 to timing belt input pinion 101 times the block-and-tackle ratio. The total transmission ratio as shown in FIG. 1 is 14:1.

Figure 2:
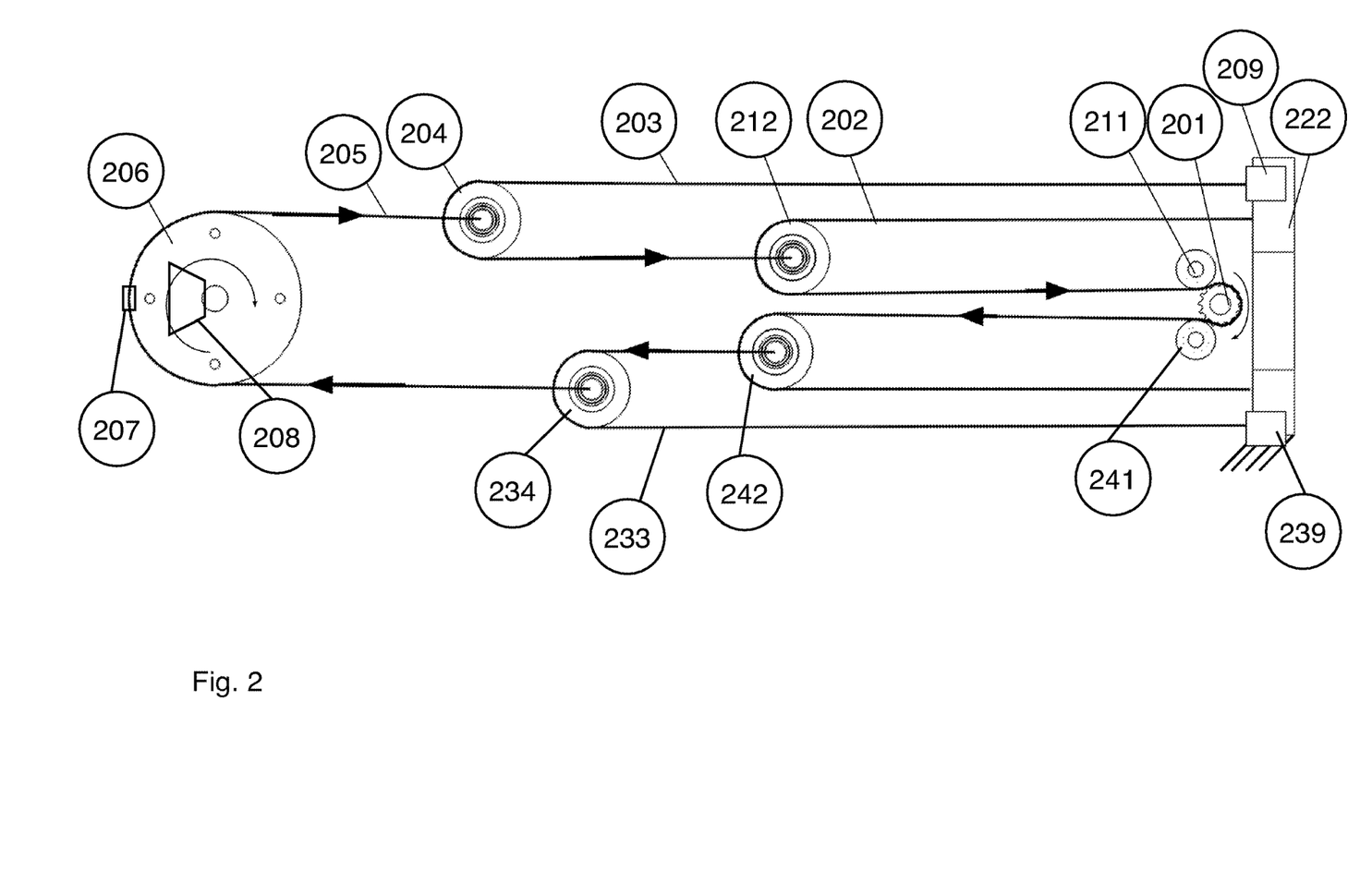
FIG. 2 is a block diagram illustrating an embodiment of a block-and-tackle transmission.

FIG. 2 is a block diagram illustrating an embodiment of a block-and-tackle transmission. In the example shown, the block-and-tackle transmission of FIG. 2 comprises timing belt input pinion 201; timing belt 202; stage-1 cable 203 and stage-1 cable 233; stage-2 shuttle 204 and stage-2 shuttle 234; output cable 205; output hub 206; output cable termination 207; tension sensor 209 and tension sensor 239; belt idler 211 and belt idler 241; stage-1 shuttle 212 and stage-1 shuttle 242; and transmission chassis 222.

In the example shown, there are two block-and-tackle stages in serial, producing a block-and-tackle ratio of 4:1. The transmission ratio is varied to be higher and lower according to design requirements. In some embodiments, the diameter of the pulleys in the shuttles (e.g., stage-1 shuttle 212 and stage-1 shuttle 242, stage-2 shuttle 204 and stage-2 shuttle 234), the diameter of output hub 206, and the diameter of timing belt input pinion 201 are chosen such that the bend radius of the tensile element is not so severe as to affect the lifespan of the material. In some embodiments, steel cables are used in the block-and-tackle transmission. The cables are used due to the high-load capacity and the light-weight obtained. The cable of each block-and-tackle stage is terminated on the transmission chassis at each end (e.g., by tension sensor 209 and tension sensor 239). Output cable 205 is affixed to output hub 206 by friction or by mechanical means (e.g., by output cable termination 207). In some embodiments, an angle sensor (e.g., output angle sensor 208) measures the angular position of output hub 206. In various embodiments, the block-and-tackle belts and cables (e.g., timing belt 202; stage-1 cable 203; stage-1 cable 233; output cable 205) comprise any type of flexible tensile element, for example, timing belts, steel cable, fiber ropes, steel bands, or any other appropriate flexible tensile elements.

The key attributes of this design include: belts and cables provide very high strength for a light weight; belts and cables are known to be very efficient (>95%); belts and cables are zero backlash; belts and cables provide transmission elasticity which is advantageous for impact protection and torque control; drive components lie in a single plane, creating a thin and long actuator that is well suited for robot arms and legs; precision alignment and manufacturing tolerances are not required as the belts and cables tolerate misalignments; the known benefits of cable drive transmissions are retained without the complexity of managing multiple cable turns on capstans; and low preload tension in the transmission may be used, lowering the overall system friction and allowing for very high efficiency.

The transmission provides a simple method for measuring the actuator output torque. As shown in FIG. 2, the load path of one or more stages of the block and tackle terminates on transmission chassis 222. Tension sensor 209 is placed in-line with the load path such that it is affixed between stage-1 cable 203 and transmission chassis 222, similarly, tension sensor 239 is placed in-line with the load path such that it is affixed between stage-1 cable 233 and transmission chassis 222. A torque applied to output hub 206 is transformed into a tension in output cable 205. This tension is then reduced by the block-and-tackle ratio and passed through tension sensor 209 and tension sensor 239 to the transmission chassis 222. By placing sensors at each leg of the block-and-tackle, a torque can be sensed in both directions. In some embodiments, tension sensor 209 and tension sensor 239 each comprise a strain-gauge load cell sensor. In some embodiments, the tension sensor 209 and tension sensor 239 are wired in a configuration such that they reject common mode noise and/or compensate for temperature drift. In some embodiments, a digital acquisition system subtracts the tension of tension sensor 209 and tension sensor 239 to obtain the output torque. In various embodiments, the tension sensor 209 and tension sensor 239 each comprises a capacitive load cell, a spring with position transducers, or any other appropriate mechanism to measure the tension of a tensile element. In some embodiments, only one tension sensor is used.

Figure 3:
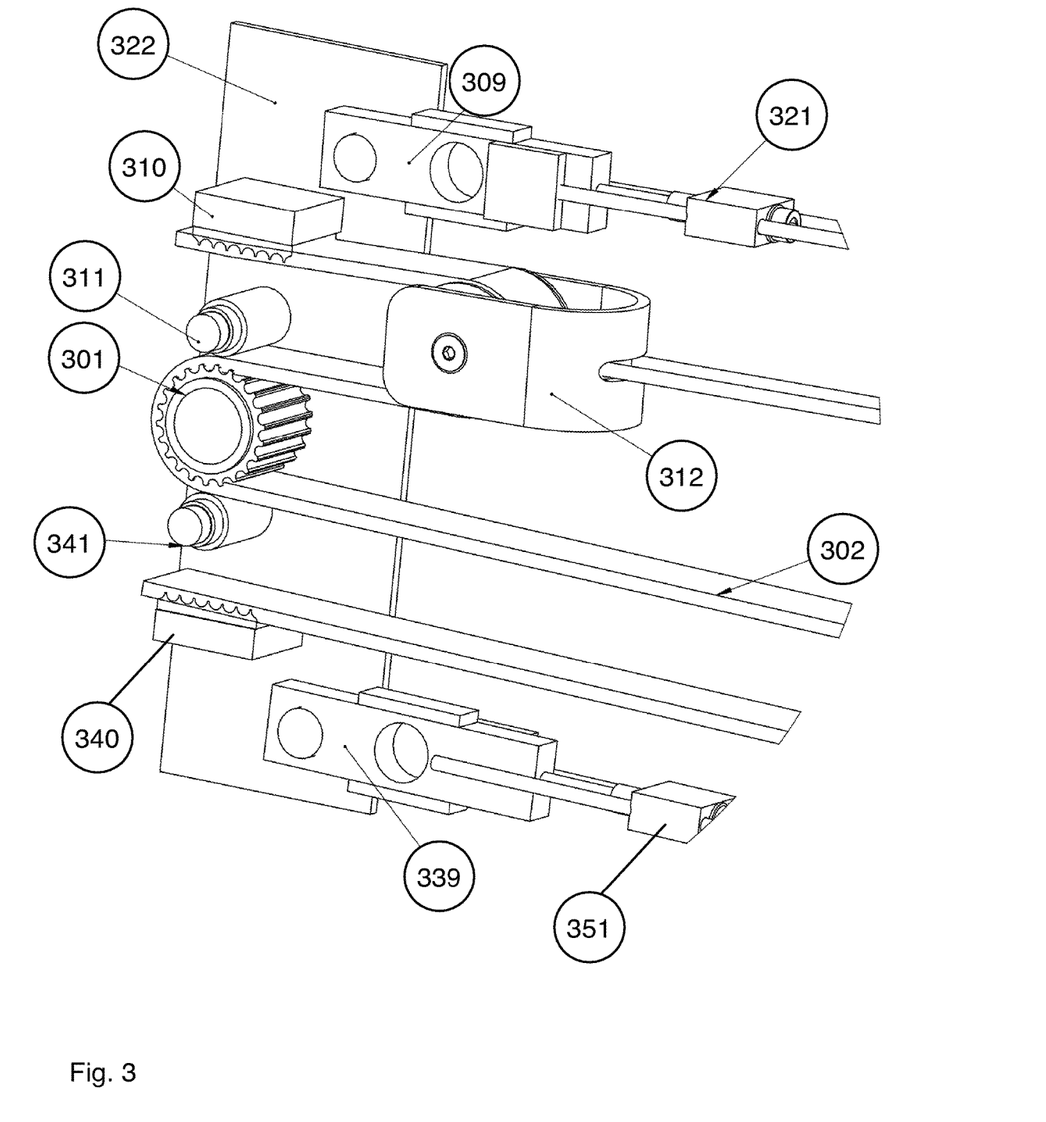
FIG. 3 is a diagram illustrating an embodiment of a portion of a block-and-tackle transmission.

FIG. 3 is a diagram illustrating an embodiment of a portion of a block-and-tackle transmission. In the example shown, the portion of block-and-tackle transmission of FIG. 3 comprises timing belt input pinion 301; timing belt 302; tension sensor 309 and tension sensor 339; belt termination 310 and belt termination 340; belt idler 311 and belt idler 341; stage-1 shuttle 312; transmission chassis 322; and tensioner 321 and tensioner 351.

Typically in cable and belt transmission the tensile element must be pre-tensioned to 50% of the maximum working load. This ensures that the cable or belt never goes slack when loaded. A slack cable can catastrophically cause the transmission to derail. The pre-tension forces heavier components to be used due to high loads on the transmission bearings and structure. It also increases the system friction significantly, lowering the overall efficiency. Therefore it is advantageous for a cable and belt transmission to not require 50% pre-tension.

In the example shown, in FIG. 3, the block-and-tackle cables may go slack as multiple wraps around a hub are not required. Without timing belt idlers 311 and timing belt idler 341, when slack the teeth of timing belt 302 may move away from timing belt input pinion 301, reducing the overall tooth contact area. Under load, this will cause the teeth to skip. As shown in FIG. 3, timing belt 302 wraps one-half of a turn around timing belt input pinion 301. Timing belt idler 311 and timing belt idler 341 are positioned to ensure the teeth of timing belt 302 remain engaged with timing belt input pinion 301 at all times, even when timing belt 302 is slack, thereby preventing teeth skipping. Timing belt idler 311 and timing belt idler 341 are spaced as to not create additional drag on timing belt 302 when not under load. In some embodiments, only one timing belt idler is used. The overall transmission is pre-tensioned to just above zero-tension (e.g., 10% of max working load). Timing belt 302 is terminated on transmission chassis 322. One end of timing belt 302 is clamped between transmission chassis 322 and belt termination 310; the opposing end of timing belt 302 is clamped between transmission chassis 322 and belt termination 340. At each end, one or both of transmission chassis 322 and the belt termination (e.g., belt termination 310 or belt termination 340) have teeth matched to the tooth profile of timing belt 302.

Figure 4:
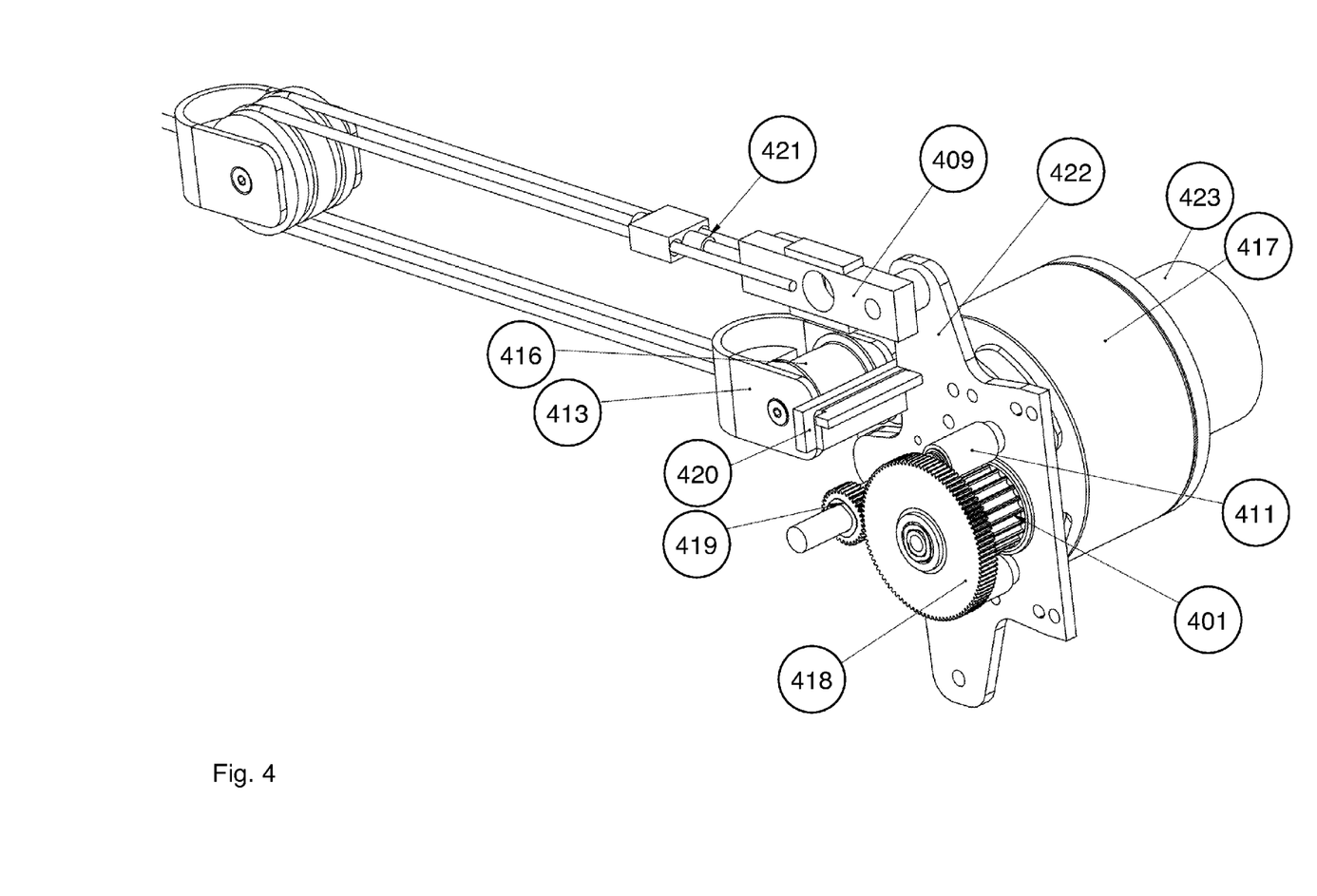
FIG. 4 is a block diagram illustrating an embodiment of a block-and-tackle transmission including an input motor.

FIG. 4 is a block diagram illustrating an embodiment of a block-and-tackle transmission including an input motor. In the example shown, FIG. 4 comprises timing belt input pinion 401; tension sensor 409; belt idler 411, shuttle clevis 413; shuttle pulley 416; motor 417; input gear 418; pinion gear 419; end stop 420; tensioner 421; transmission chassis 422; and motor encoder 423.

In the example shown, the input to the transmission is motor 417. In some embodiments, the input to the transmission is any rotary actuator. Motor encoder 423 is used to directly measure and control the motor position. When a higher transmission ratio is desired than is practically possible using the block-and-tackle, an input transmission is used to increase the transmission ratio. In some embodiments, motor spur pinion 419 and input spur gear 418 comprise an input transmission. In the example shown, motor spur pinion 419 drives input spur gear 418, rigidly attached to timing belt input pinion 401. When an input reduction is used, the block-and-tackle transmission acts as a compliant high load capacity output stage, allowing the input reduction load requirements to be reduced such that lightweight materials such as plastic can be used. In various embodiments, the type of input transmission comprises belts, cables, planetary gearbox, a Harmonic Drive, or any other appropriate transmission.

In addition, in the example shown, transmission chassis 422 includes end stop 420 that allows the motion of block-and-tackle shuttle clevis 413 to hard-stop. In some embodiments, end stop 420 includes a rubber (or other compliant material) bumper to reduce the severity of hard-stop impacts. The block-and-tackle system of FIG. 4 additionally comprises tensioner 421 that allows for precision pre-tensioning of the transmission. In some embodiments, the block-and-tackle system of FIG. 4 additionally comprises a cable ferrule, including threaded features that allow the cable length to be shortened by turning a screw.

Figure 5:
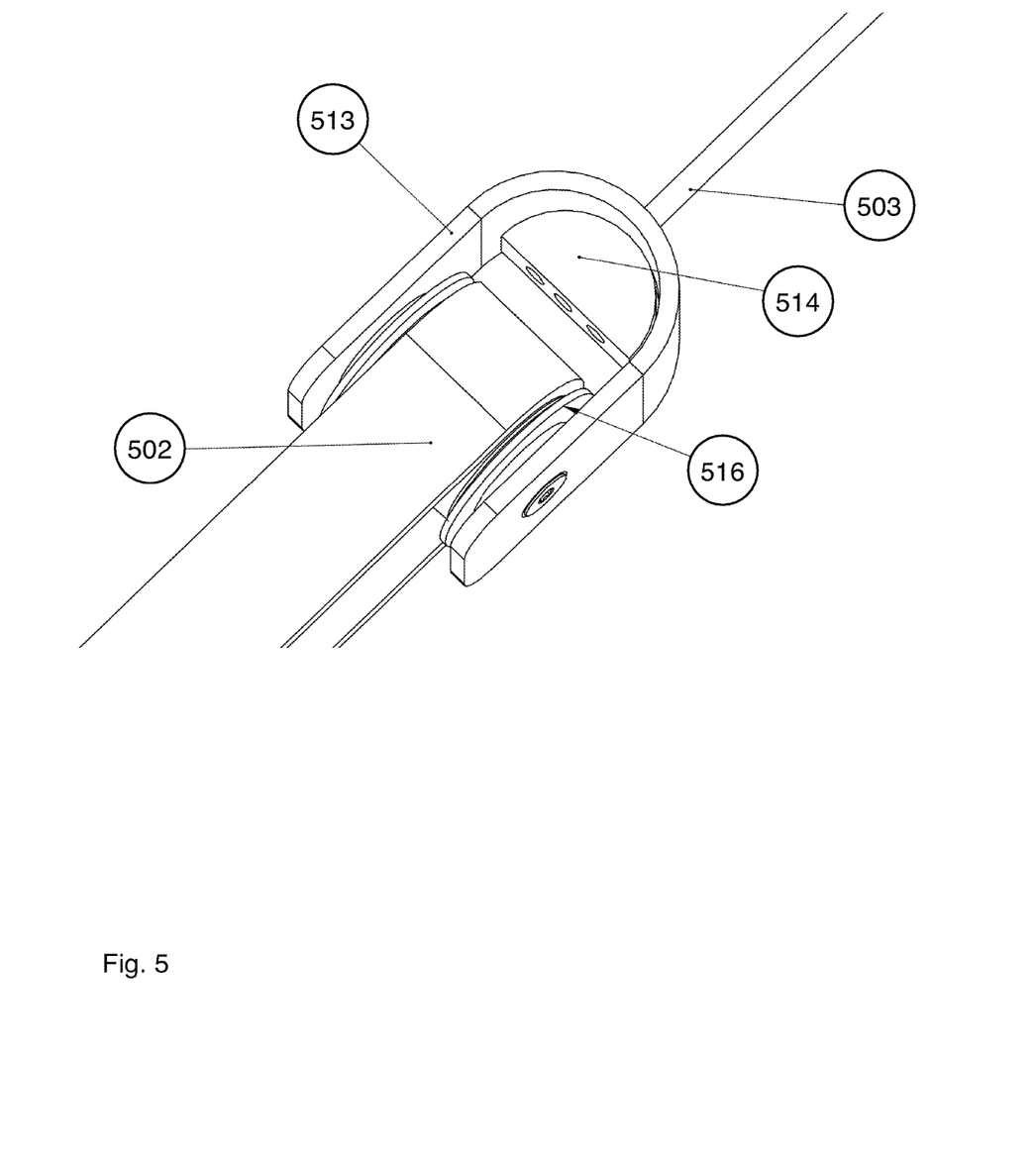
FIG. 5 is a diagram illustrating an embodiment of a block-and-tackle shuttle.

FIG. 5 is a diagram illustrating an embodiment of a block-and-tackle shuttle. In some embodiments, a block-and-tackle transmission comprises one or more shuttles (e.g., stage-2 shuttle 104 of FIG. 1, stage-2 shuttle 134 of FIG. 1, stage-1 shuttle 112 of FIG. 1, stage-1 shuttle 142 of FIG. 1). The shuttle of FIG. 5 comprises pulley 516, supporting clevis 513, input tensile element 502, and output tensile element 503. In the example shown, input tensile element 502 wraps around pulley 516, and output tensile element 503 is terminated at supporting clevis 513 by ferrule 514. If input tensile element 502 comprises a timing belt (e.g., timing belt 102 of FIG. 1), it is critical that the pulley 516 and the timing belt are parallel, otherwise the timing belt may translate off of pulley 516 during operation. In practice there may be internal forces generated as the block- and tackle transmission is tensioned which cause pulley 516 to rotate with respect to the timing belt. Ferrule 514 comprises a curved mechanism that allows pulley 516 to self-align to the timing belt. The radius of the curve of ferrule 514 is slightly less than the radius of clevis 513. This 'ball-and-socket' type configuration allows clevis 513 to self-align. The curved shape also reduces stress concentrations in the clevis 513 and ferrule 514.

During operation the shuttle of FIG. 5 may vibrate at the resonant frequency of the tensile elements (e.g., input tensile element 502 and output tensile element 503). It can be advantageous to restrict out-of-plane motion of the shuttle through the use of a linear guide. Such a guide should impart little to no friction to the shuttle during in-plane motions.

In some embodiments, the transmission is used in a control loop such that the position of the output hub (e.g., output hub 106 of FIG. 1) is controlled using digital feedback from the output position sensor (e.g., output angle sensor 108 of FIG. 1). In some embodiments, digital feedback additionally comes from a sensor or encoder (e.g., motor encoder 423 of FIG. 4) mounted directly to the motor (e.g., motor 417 of FIG. 4). In some embodiments, the transmission is used in a control loop such that the torque applied at the output hub (e.g., output hub 106 of FIG. 1) is controlled using digital feedback from tension sensors (e.g., tension sensor 209 of FIG. 2 and tension sensor 239 of FIG. 2). In some embodiments, when the transmission is used in a control loop, a model of the block-and-tackle transmission dynamics is used. The transmission inertial forces can be estimated by the model and actively cancelled in the controller.

Figure 6:
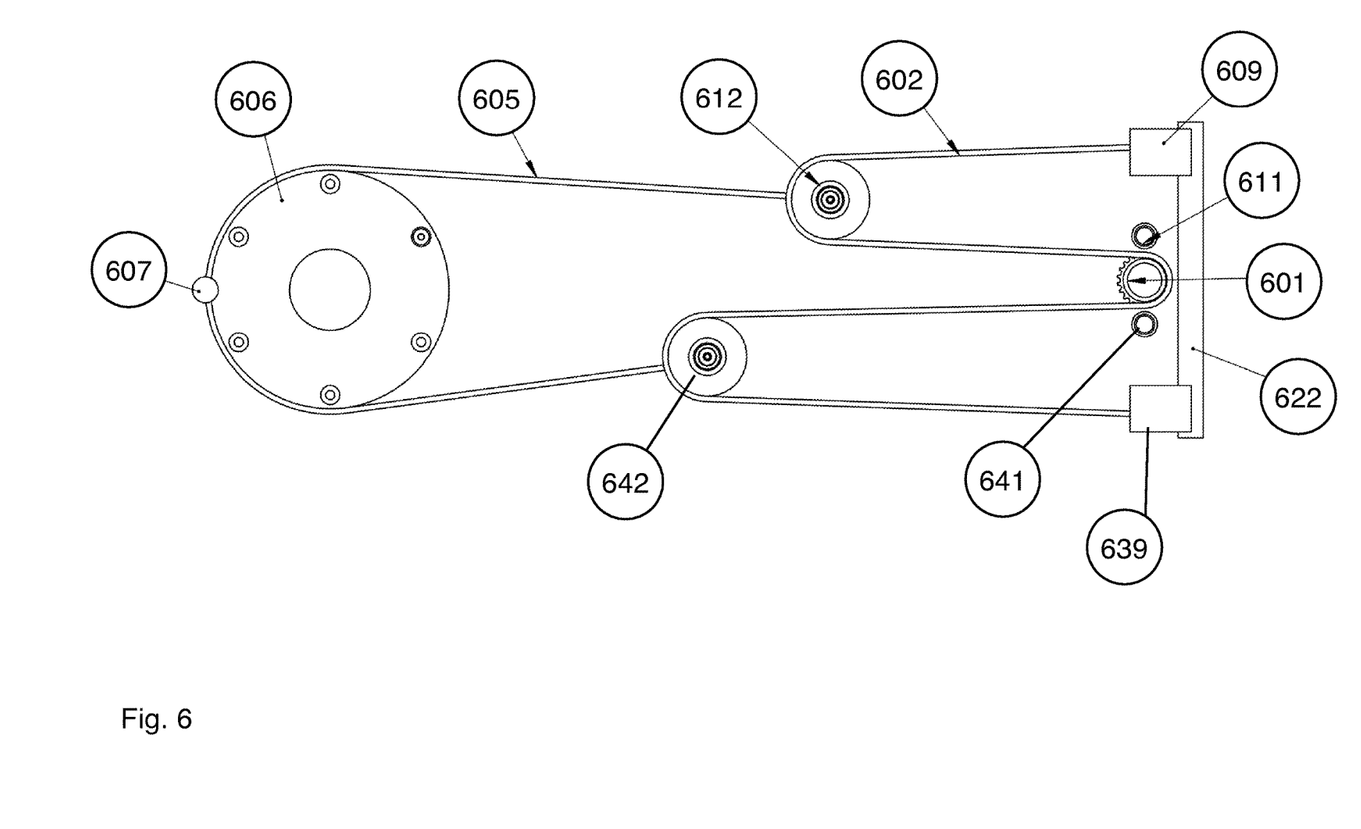
FIG. 6 is a block diagram illustrating an embodiment of a block-and-tackle transmission.

FIG. 6 is a block diagram illustrating an embodiment of a block-and-tackle transmission. In the example shown, the block-and-tackle transmission of FIG. 6 comprises timing belt input pinion 601; timing belt 602; output cable 605; output hub 606; output cable termination 607; tension sensor 609 and tension sensor 639; belt idler 611 and belt idler 641; stage-1 shuttle 612 and stage-1 shuttle 642; and transmission chassis 622. In the example shown, a single Gun Tackle stage produces a force amplification of 2:1. In the block-and-tackle transmission of FIG. 1, two Gun Tackle stages are used in serial to produce a force amplification of 4:1.

Figure 7:
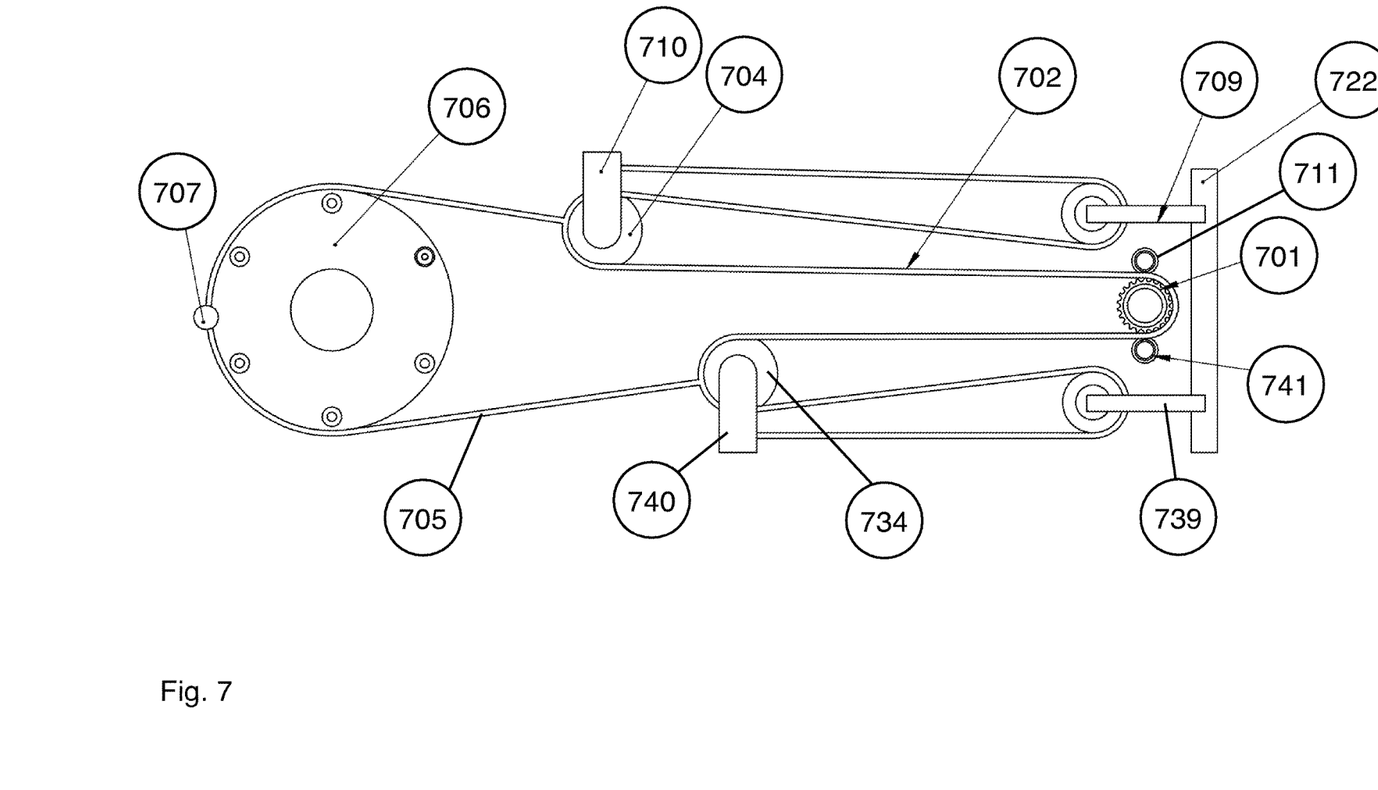
FIG. 7 is a block diagram illustrating an embodiment of a block-and-tackle transmission.

FIG. 7 is a block diagram illustrating an embodiment of a block-and-tackle transmission. In the example shown, the block-and-tackle transmission of FIG. 7 comprises timing belt input pinion 701; timing belt 702; shuttle 704 and shuttle 734; output cable 705; output hub 706; output cable termination 707; tension sensor 709 and tension sensor 739; belt termination 710 and belt termination 740; belt idler 711 and belt idler 741; and transmission chassis 722. In the example shown, a single Luff Tackle stage produces a force amplification of 4:1. In various embodiments, different configurations of a block-and-tackle are used, for example, Luff Tackle, Double Tackle, Gun Tackle, Threefold Purchase, etc. In some embodiments, these configurations are arranged serially as many times as is required.

In some embodiments, it is advantageous to monitor the transmission during operation for catastrophic failures as well as long-term wear. In some embodiments, cable breakage is monitored by comparing a measurement from an output angle sensor (e.g., output angle sensor 108 of FIG. 1) to a measurement from a motor angle sensor (e.g., angle sensor 423 of FIG. 4). In some embodiments, bearing failure is monitored by measuring the applied motor current for location dependent discontinuities. In some embodiments, tension sensor failure and drift is monitored by estimating the torque as a function of transmission stretch (e.g., the difference between the motor (e.g., motor 417 of FIG. 4) and the output angle sensor (e.g., output angle sensor 108 of FIG. 1) readings). In some embodiments, cable creep is monitored by measuring the transmission pre-tension using the tension sensors (e.g., tension sensor 109 of FIG. 1 and tension sensor 139 of FIG. 1). In some embodiments, belt tooth slippage is monitored by comparing the range of motion of the output hub (e.g., output hub 106 of FIG. 1) to the range of motion of the motor (e.g., motor 417 of FIG. 4).

Figure 8A:
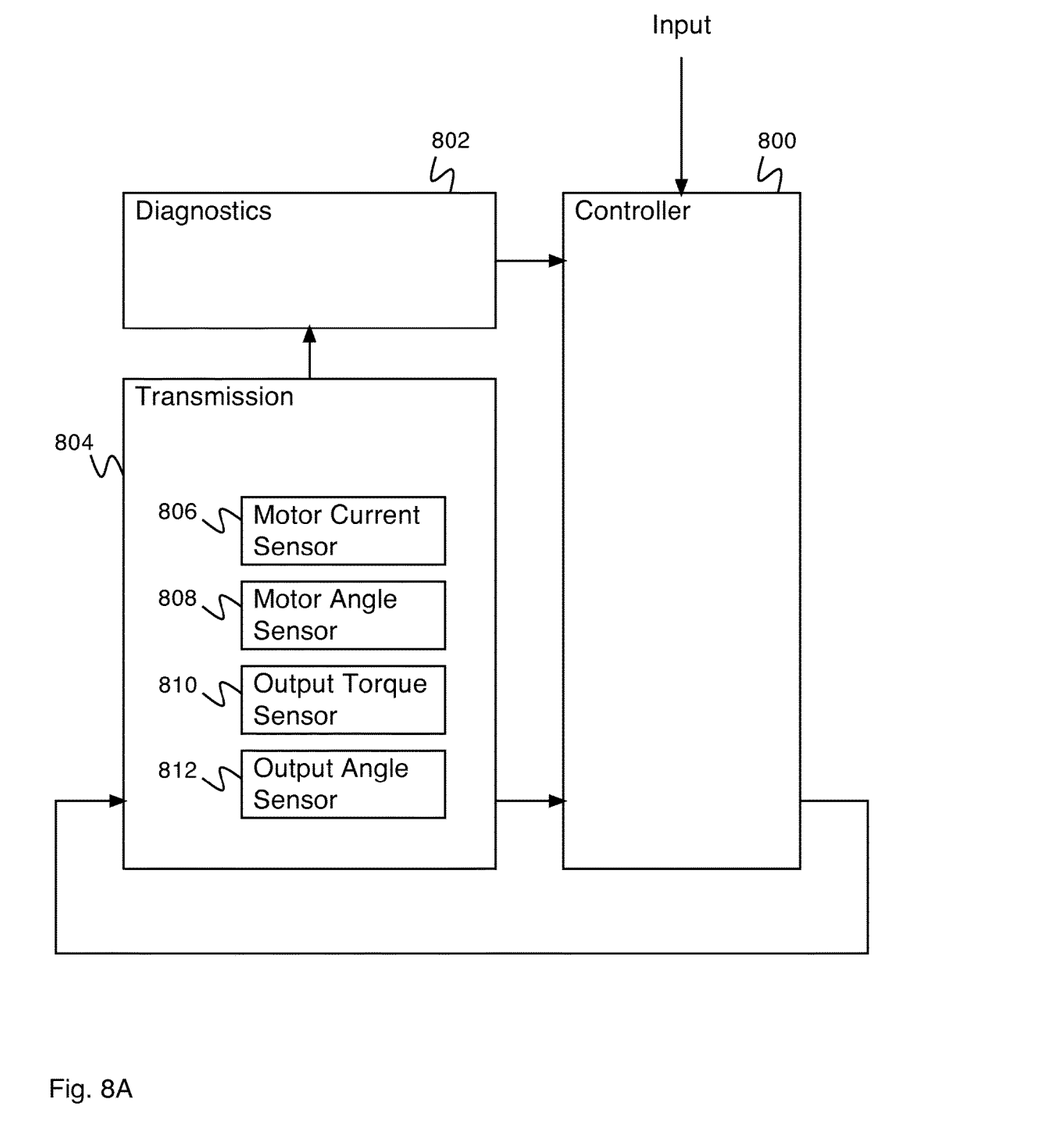
FIG. 8A is a block diagram illustrating an embodiment of a system for feedback control of a block-and-tackle transmission.

FIG. 8A is a block diagram illustrating an embodiment of a system for feedback control of a block-and-tackle transmission. In some embodiments, transmission 804 comprises the block-and-tackle transmission of FIG. 1. In the example shown, the system for feedback control of a block-and-tackle transmission comprises controller 800, diagnostics 802, and transmission 804. Diagnostics 802 receives information describing the performance of transmission 804 and uses the information to determine status information describing parts of transmission 804. In various embodiments, diagnostics 802 receives an output angle, a motor angle, an output torque, a motor current, or any other appropriate transmission performance information. In various embodiments, diagnostics 802 determines a break or slip fault, pretension and creep, a tension failure, a transmission fault or failure, the need for transmission recalibration or service, or any other appropriate transmission status. In some embodiments, diagnostics 802 provides transmission status information to controller 800. Transmission 804 comprises a transmission for transmitting rotational energy. In some embodiments, transmission 804 provides mechanical advantage (e.g., reduces rotational speed and increases rotational force). In some embodiments, transmission 804 comprises a motor for producing rotational energy. In some embodiments, transmission 804 comprises a block-and-tackle transmission. In some embodiments, transmission 804 comprises the block-and-tackle transmission of FIG. 1. In the example shown, transmission 804 comprises sensors for sensing transmission performance information. Transmission 804 comprises motor current sensor 806 for sensing the motor current, motor angle sensor 808 for sensing the motor angle, output torque sensor 810 for sensing the output torque, and output angle sensor 812 for sensing the output angle. Controller 800 receives transmission performance information from transmission 804 (e.g., an output angle, a motor angle, an output torque, a motor current, or any other appropriate transmission performance information) and transmission status information from diagnostics 802 (e.g., a break or slip fault, pretension and creep, a tension failure, a transmission fault or failure, the need for transmission recalibration or service, or any other appropriate transmission status information), as well as an input describing the desired output from transmission 804. Controller 800 uses the received information to determine appropriate control signals for transmission 804. In some embodiments, controller 800 controls the input power to transmission 804. The following are three examples where diagnostics can be used to detect an issue with the transmission:

1) Under normal operation, the output angle sensor will change relative to the motor angle sensor and any deflection of the output due to an applied load. The values of the motor angle sensor and the output torque sensor can be compared to the output angle sensor. It can be determined whether the output angle is beyond the expected value. In the event that the output angle is beyond the expected value, it is indicated that a failure in the transmission (e.g. belt slippage, broken gear tooth) has occurred.

2) Bearings in the transmission wear over the lifetime of the transmission based on loading of the transmission (e.g. duty cycle, oscillating loading, etc.) and non-ideal operating environments (e.g. dust, dirt, contaminates, etc.). Motor current sensor data can be compared to the output torque of the transmission and can be tracked over time to determine when the efficiency of the transmission has dropped below an acceptable threshold. The diagnostics can then issue a warning that service will be required (e.g., the system indicates that service is required or the system sends a message to a service provider for service) or the system can be safely shutdown when a catastrophic failure is predicted (e.g., the system can suspend operation or can immobilize the transmission or motor).

3) In an embodiment similar to FIG. 3, tension sensors (e.g., tension sensors similar to tension sensors 309 & 339) should return similar values when the system is unloaded and the transmission is properly tensioned. If these values decrease over time, diagnostics can indicate that the transmission is losing tension resulting in lower stiffness at the output joint. Below a certain value the transmission will require service, to prevent a catastrophic failure such as belt slippage or a cable coming out of its operation track (e.g., a determination is made that the tension as indicated by the tension sensor signals is used to determine whether the values of the signal drop below a predetermined level. In that event, the system indicates that service is required or the system sends a message to a service provider for service or the system can suspend operation or can immobilize the transmission or motor).

Figure 8B:
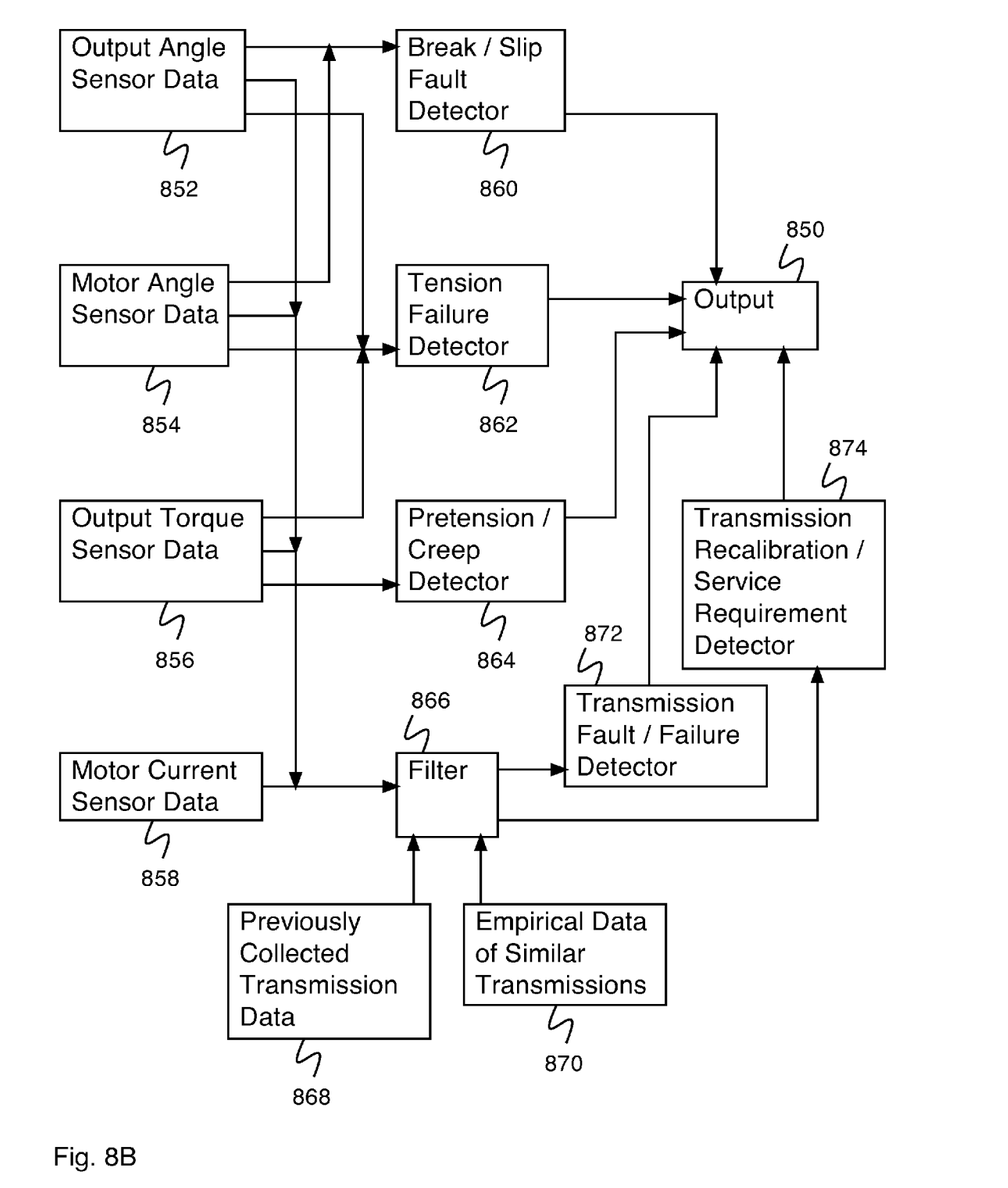
FIG. 8B is a block diagram illustrating an embodiment of diagnostics for a system for feedback control of a block-and-tackle transmission.

FIG. 8B is a block diagram illustrating an embodiment of diagnostics for a system for feedback control of a block-and-tackle transmission. In some embodiments, the block diagram of FIG. 8B implements diagnostics 802 of FIG. 8A. In the example shown, the diagnostics of FIG. 8B comprises output angle sensor data 852 (e.g., data received from an output angle sensor—e.g., output angle sensor 812 of FIG. 8A), motor angle sensor data 854 (e.g., data received from a motor angle sensor—e.g., motor angle sensor 808 of FIG. 8A), output torque sensor data 856 (e.g., data received from an output torque sensor—e.g., output torque sensor 801 of FIG. 8A), and motor current sensor data 858 (e.g., data received from a motor current sensor—e.g., motor current sensor 806 of FIG. 8A). FIG. 8B additionally comprises break/slip fault detector 860 for detecting break and slip faults. In the example shown, break/slip fault detector 860 analyzes output angle sensor data 852 and motor angle sensor data 854 to detect break and slip faults and provides break and slip fault information to output 850. FIG. 8B additionally comprises tension failure detector 862 for detecting tension failure. Tension failure detector 862 analyzes output angle sensor data 852, motor angle sensor data 854, and output torque sensor data 856 to detect tension failure and provides tension failure information to output 850. FIG. 8B additionally comprises pretension/creep detector 864 for detecting pretension and creep. Pretension/creep detector 864 analyzes output torque sensor data 856 to detect pretension and creep and provides pretension and creep information to output 850. In some embodiments, pretension/creep detector 864 analyzes data from more than one torque sensor to detect pretension and creep. FIG. 8B additionally comprises transmission fault/failure detector 872 for detecting transmission fault and failure and transmission recalibration/service requirement detector 874 for determining transmission recalibration or service required. Transmission fault/failure detector 872 and transmission recalibration/service requirement detector 874 receive data from filter 866 indicating if the system is acting abnormally. Filter 866 compares output angle sensor data 852, motor angle sensor data 854, output torque sensor data 856, and motor current sensor data 858 with previously collected transmission data 868 and empirical data of similar transmissions 870 and filters the results of the comparison to provide data indicating if the system is acting abnormally to transmission fault/failure detector 872 and transmission recalibration/service requirement detector 874. Transmission fault/failure detector 872 provides transmission fault and failure detection information to output 850. Transmission recalibration/service requirement detector 874 provides transmission recalibration or service required information to output 850. Information provided to output 850 is then provided to a feedback controller (e.g., controller 800 of FIG. 8).

Figure 9:
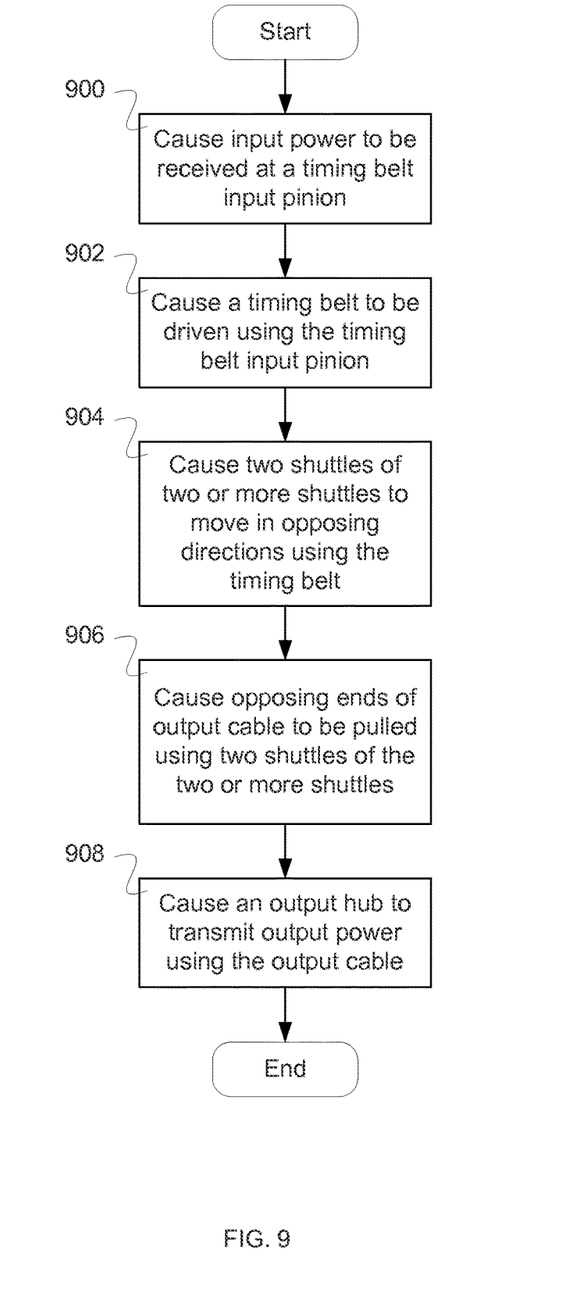
FIG. 9 is a flow diagram illustrating an embodiment of a process for transmitting power using a block and tackle transmission.

FIG. 9 is a flow diagram illustrating an embodiment of a process for transmitting power using a block and tackle transmission. In the example shown, in 900 input power is caused to be received at a timing belt input pinion. For example, a controller (e.g., a processor) is used to cause input power to be received at a timing belt input pinion (e.g., by causing a motor to be turned). In 902, a timing belt is caused to be driven using the timing belt input pinion. For example, the timing belt input pinion is caused to be turned using a motor that in turn causes the timing belt to be driven. In 904, two shuttles of the two or more shuttles are caused to be moved in opposing directions using the timing belt. For example, the timing belt is coupled to two shuttles of the two or more shuttles and causes the two shuttles to move in opposing directions using the timing belt. In 906, opposing ends of the output cable are caused to be pulled using two shuttles of the two or more shuttles. For example, an output cable is coupled to two shuttles (e.g., one shuttle at each end of the output cable) and when these shuttles are caused to be moved the output cable is moved. In 908, an output hub is caused to transmit output power using the output cable. For example, an output hub is caused to be turned using the output cable and this causes output power to be transmitted to the output hub.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A block-and-tackle transmission, comprising:
   a timing belt input pinion for receiving input power;
   a timing belt, wherein the timing belt is driven by the input pinion;
   at least four shuttles, wherein the timing belt causes two shuttles of the at least four shuttles to move in opposing directions;
   two stage-1 cables, wherein one end of each stage-1 cable terminates on one of the at least four shuttles;
   an output cable, wherein opposing ends of the output cable are pulled by two of the at least four shuttles; and
   an output hub, wherein the output cable causes the output hub to transmit output power.

2. The block-and-tackle transmission of claim 1, further comprising a transmission chassis.

3. The block-and-tackle transmission of claim 2, wherein the timing belt input pinion rotates about an axle mounted on the transmission chassis.

4. The block-and-tackle transmission of claim 2, wherein the timing belt has two ends, and wherein each end of the timing belt terminates on the transmission chassis.

5. The block-and-tackle transmission of claim 1, wherein each shuttle of the at least four shuttles comprises a pulley and a supporting clevis.

6. The block-and-tackle transmission of claim 1, wherein one or more of the at least four shuttles additionally comprises a ferrule that allows the shuttle to self-align to the timing belt.

7. The block-and-tackle transmission of claim 1, wherein the timing belt comprises teeth, wherein the teeth engage the timing belt input pinion.

8. The block-and-tackle transmission of claim 7, further comprising one or more belt idlers positioned to ensure the timing belt teeth remain engaged with the timing belt input pinion at all times.

9. The block-and-tackle transmission of claim 1, further comprising one or more tension sensors positioned to measure tension in the output cable.

10. The block-and-tackle transmission of claim 9, wherein the one or more tension sensors comprise two tension sensors configured to reject common mode noise.

11. The block-and-tackle transmission of claim 9, wherein the one or more tension sensors comprise two tension sensors configured to compensate for temperature drift.

12. The block-and-tackle transmission of claim 1, further comprising an output cable termination to affix the output cable to the output hub.

13. The block-and-tackle transmission of claim 1, further comprising an output angle sensor to measure the angular position of the output hub.

14. The block-and-tackle transmission of claim 1, further comprising a motor for driving the timing belt input pinion.

15. The block-and-tackle transmission of claim 14, further comprising a motor encoder to measure the motor position.

16. The block-and-tackle transmission of claim 1, further comprising an input transmission to increase the transmission ratio.

17. The block-and-tackle transmission of claim 16, wherein the input transmission comprises a motor spur pinion and an input spur gear.

18. The block-and-tackle transmission of claim 1, further comprising sensors for sensing performance information.

19. The block-and-tackle transmission of claim 1, further comprising diagnostics for determining status information describing parts of the block-and-tackle transmission.

20. The block-and-tackle transmission of claim 19, wherein the diagnostics receive performance information from sensors.

21. The block-and-tackle transmission of claim 1, further comprising a controller for controlling the input power.

22. The block-and-tackle transmission of claim 21, wherein the controller receives performance information from sensors and status information describing parts of the block-and-tackle transmission from diagnostics.

\* \* \* \* \*